J. F. Pond
Wringer-Roll.
Nº 42,224.    Patented Apr. 5, 1864.
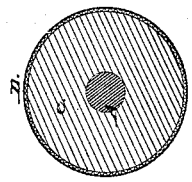
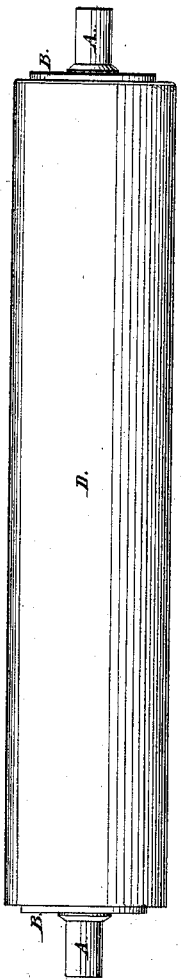
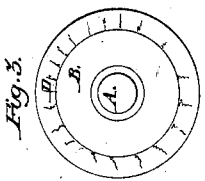
Witnesses:
Edw. F. Brown
J. B. Woodruff
Inventor:
Joseph F. Pond

UNITED STATES PATENT OFFICE.

JOSEPH F. POND, OF CLEVELAND, OHIO.

IMPROVED ROLLER FOR WRINGERS.

Specification forming part of Letters Patent No. 42,224, dated April 5, 1864.

*To all whom it may concern:*

Be it known that I, JOSEPH F. POND, of Cleveland, in the county of Cuyahoga and State of Ohio, have invented new and useful Improvements in Repairing and Protecting India-Rubber Rollers for Clothes-Wringers; and the following is a full, clear, and exact description of the same, reference being had to the accompanying drawings, making a part of this specification, in which—

Figure 1 shows a longitudinal section of a roller covered with canvas. Fig. 2, shows an end view of the roller or a section through of canvas, rubber, and shaft. Fig. 3 shows also an end view of the roller with the cloth drawn over the end.

My invention consists in the application of canvas, cloth, or other materials for the purpose of repairing, covering, and protecting india-rubber clothes-wringer rollers, and to prevent the shaft from getting loose and turning in the roller.

To enable others skilled in the art to make and apply my invention, I will describe it more fully, referring to the drawings, and to the letters of reference marked thereon.

The india-rubber roller, such as is ordinarily used for clothes-wringers, is constructed with an iron shaft, A, on which is a thick vulcanized india-rubber tube, C, the same being secured on the shaft A and kept from moving endwise by collars of metal, B B, one on each end, next the bearings of the shaft A A. Now, when india-rubber rollers constructed as above described are used for the purpose of wringing, or, more properly speaking, pressing the water out of garments made for wearing-apparel, many of which have metal buttons, and others hard material used for buttons, the tendency of which is to cut and tear the surface of the roller, and it is a well-known fact that vulcanized rubber can be easily cut when wet, and when the water is warm and soapy it is easily cut or torn by hard substances, and by being compressed upon one side and wrung upon the shaft it becomes expanded and loose, so that the shaft will turn in the rubber, and if there are rough projections or any ribs or anything protruding to act on the rubber, it soon wears off and the rollers of the wringers become useless.

By my invention or discovery india-rubber rollers used for the purpose of pressing the water out of clothes can be repaired and made more durable than at first, by covering them with heavy strong canvas, D, put on tight, the ends being brought over and gathered in, as seen at the right-hand end of the roller in Fig. 1. Rollers made for wringing-machines can be protected and made much more durable by covering in this manner. When the canvas or cloth is wet, it contracts and becomes tighter than when it is dry. Thus it compresses the rubber and forces it the more tightly upon the shaft, so that there is no danger of it turning, and the periphery of the rollers are sufficiently protected against being cut, torn, or roughened up.

Having thus described my invention, what I claim as new, and desire to secure by Letters Patent, is—

The application of canvas, cloth, or other material for the purpose of repairing, covering, and protecting torn, defaced, and solid india-rubber clothes-wringer rollers, and to prevent the shaft from turning or getting loose in the roller, as and for the purpose herein set forth.

JOSEPH F. POND.

Witnesses:
EDM. F. BROWN,
J. B. WOODRUFF.